Jan. 16, 1951    J. L. HART, JR    2,538,454
APPARATUS FOR HARVESTING COTTON
Filed Sept. 13, 1945    5 Sheets-Sheet 1
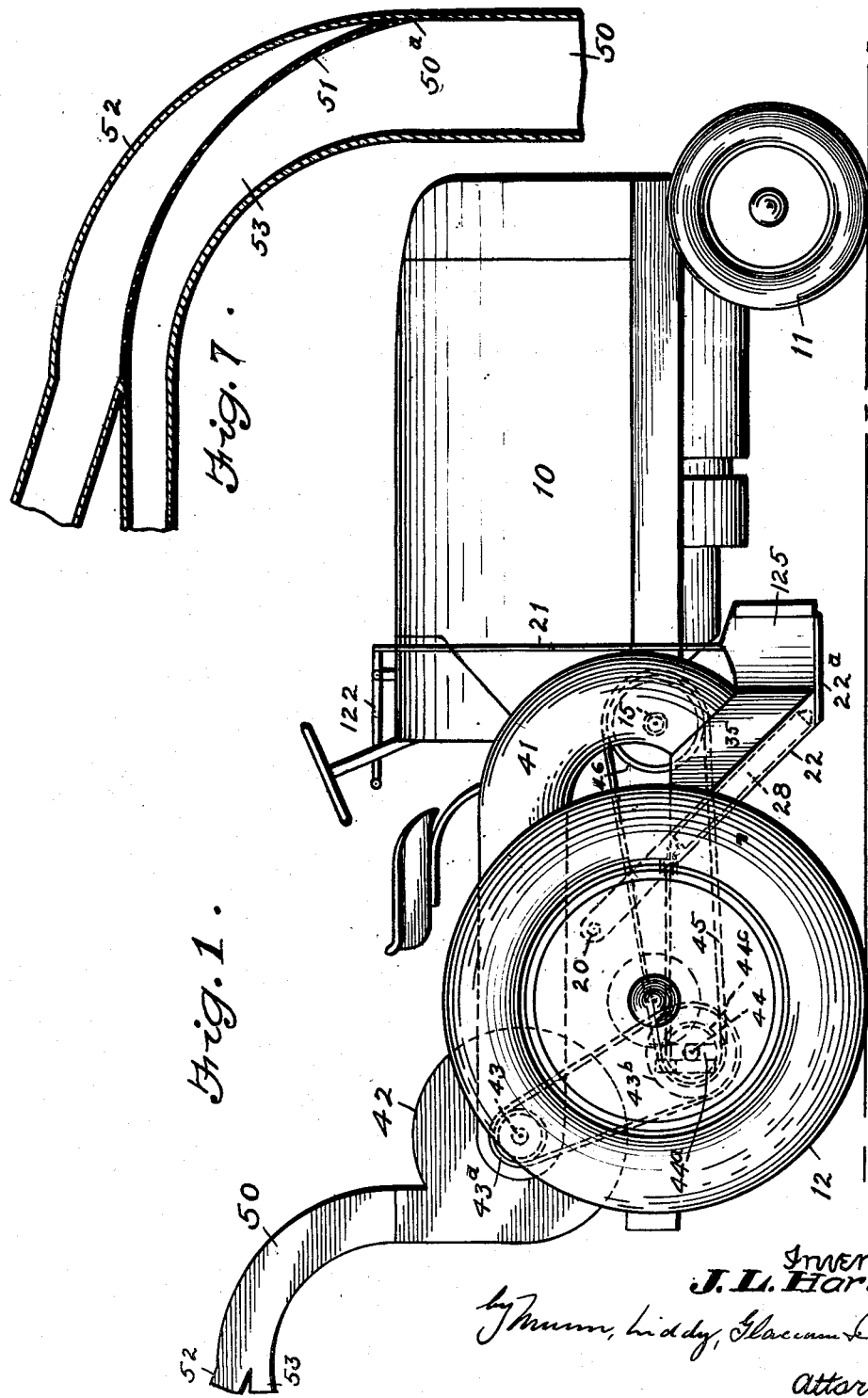

Jan. 16, 1951 J. L. HART, JR 2,538,454
APPARATUS FOR HARVESTING COTTON
Filed Sept. 13, 1945 5 Sheets-Sheet 2
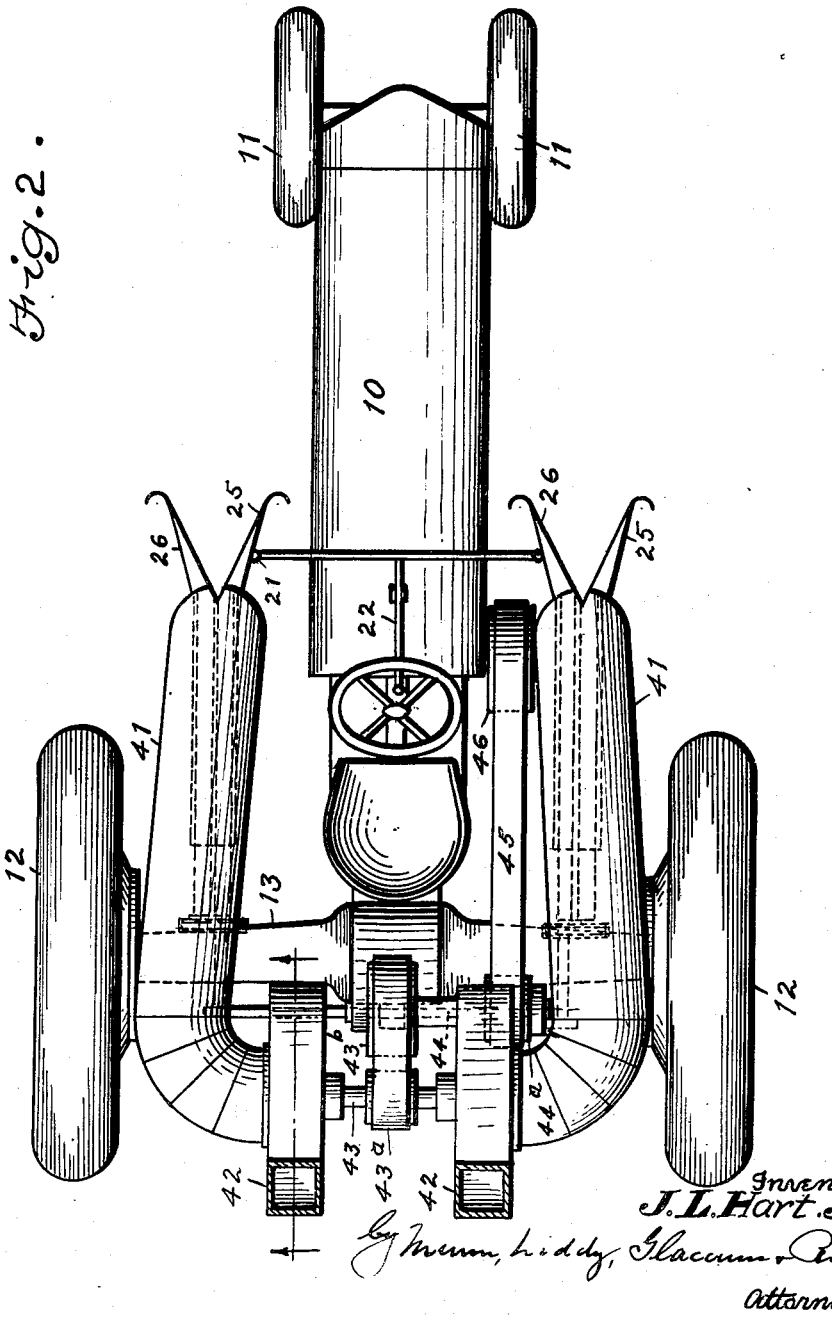

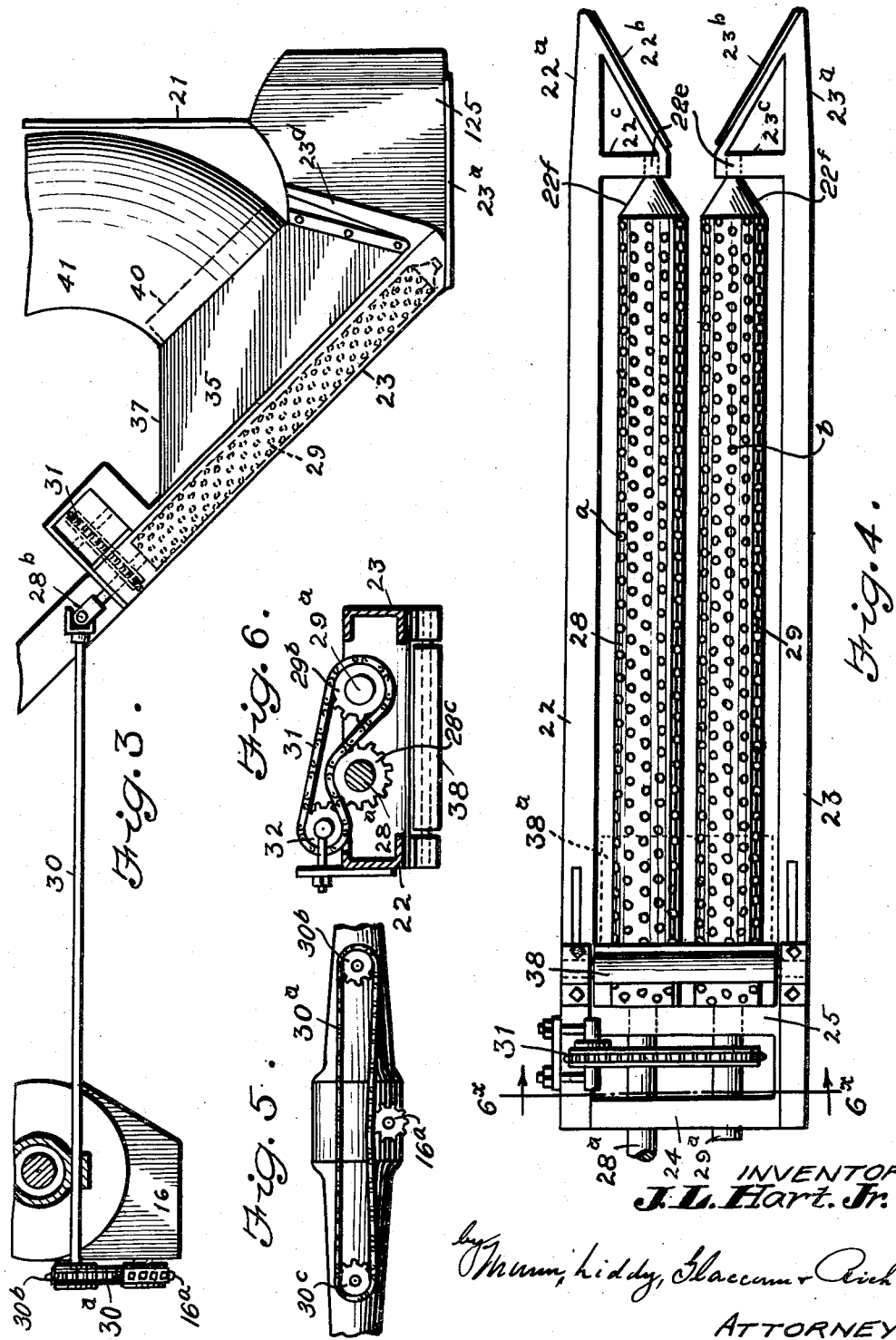

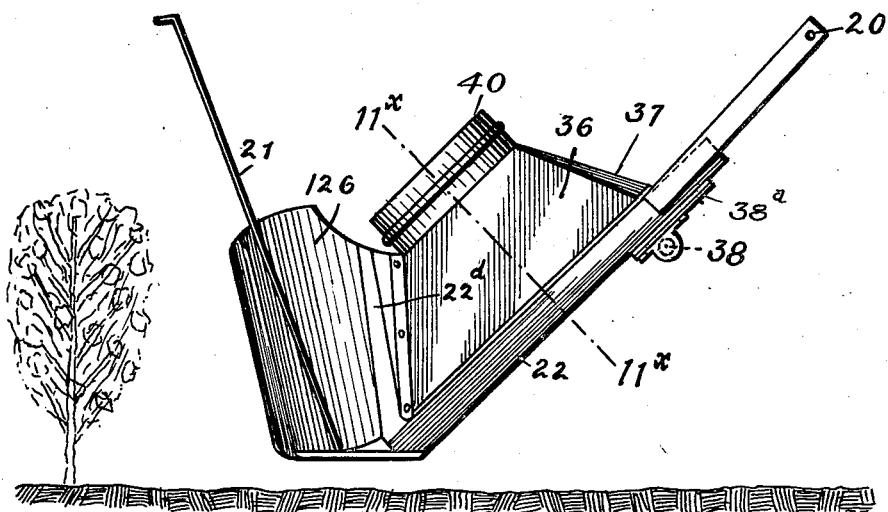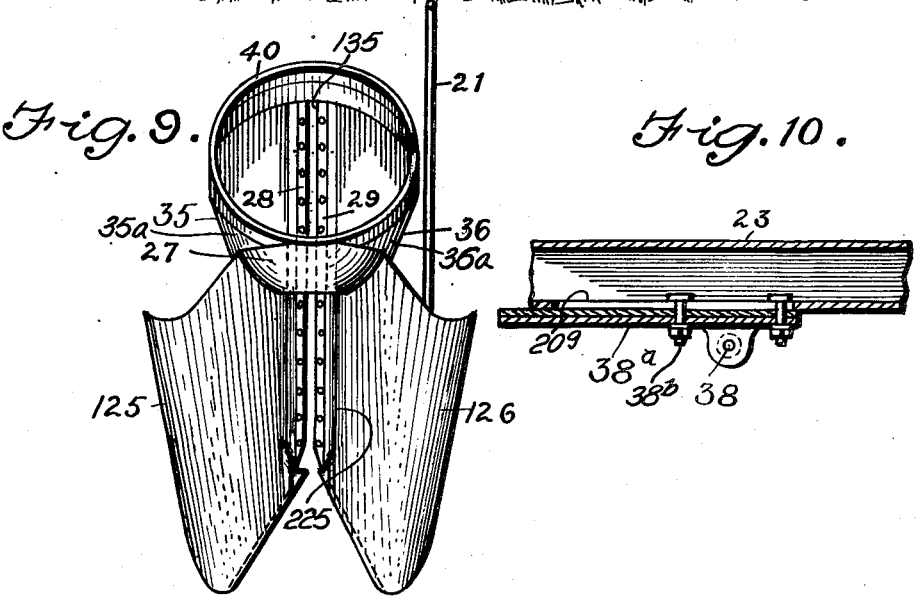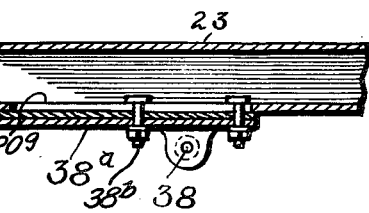

Jan. 16, 1951 J. L. HART, JR 2,538,454
APPARATUS FOR HARVESTING COTTON
Filed Sept. 13, 1945 5 Sheets-Sheet 5
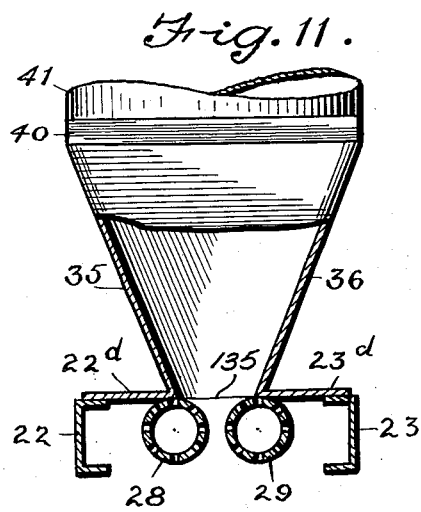
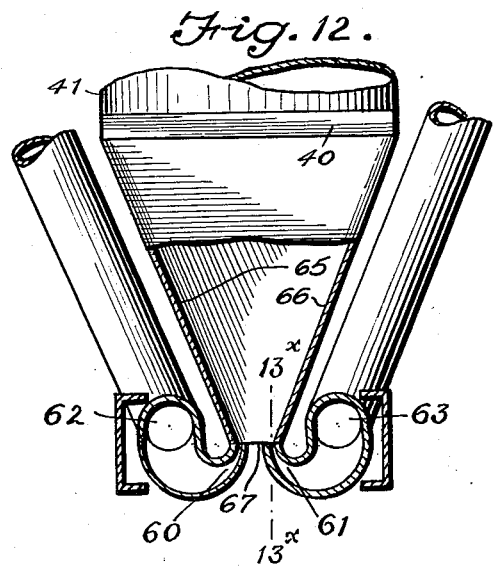
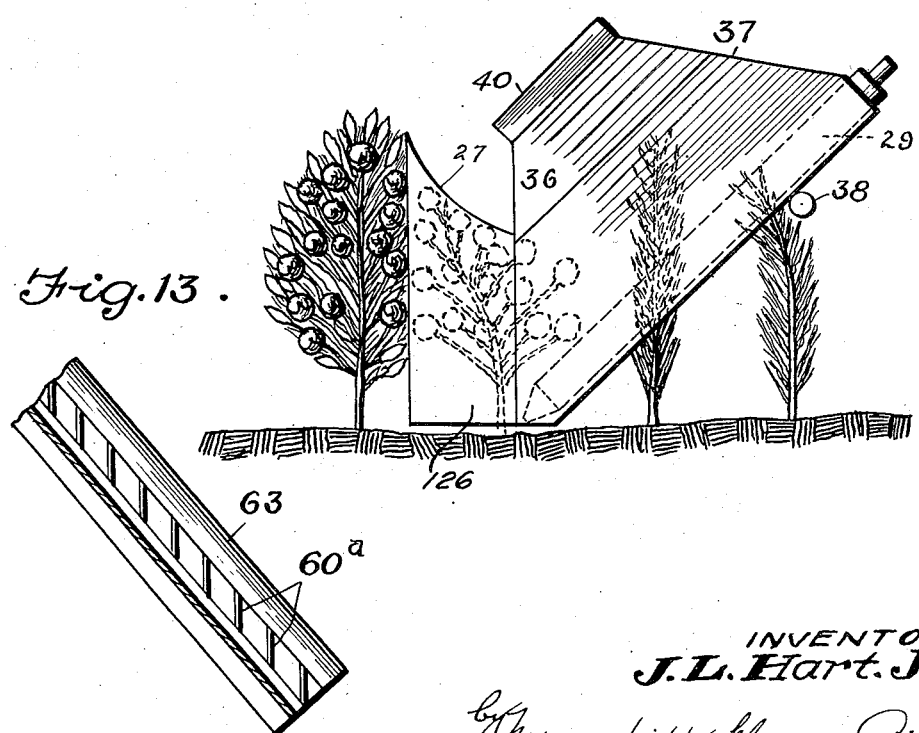
INVENTOR
J. L. Hart. Jr.
ATTORNEYS Patented Jan. 16, 1951

2,538,454

UNITED STATES PATENT OFFICE 2,538,454

APPARATUS FOR HARVESTING COTTON

Joseph L. Hart, Jr., Chickasha, Okla.

Application September 13, 1945, Serial No. 615,975

4 Claims. (Cl. 56—30)

For the purpose of harvesting cotton, I have evolved a principle of operation which combines an adaptation of mechanical elements for gathering the stalks of a plant together under a hood and subjecting the cotton on the open bolls to an air stream which at once removes the fluff or loose cotton and in many instances completely detaches the remainder from the bolls, and where this is incomplete such remainder is stripped mechanically while it is still subjected to the air stream. In each of these steps of the operation the air stream conveys the cotton to a point of discharge where it is collected.

In addition to the foregoing, my invention comprehends an arrangement of parts adapted for application to an agricultural vehicle whereby one or more rows of cotton plants in a field may be traversed to strip the plants by successively gathering their outstretched stalks together along their main plant stems and causing them in this bunched form to pass through a throat which is sufficiently narrow so that the stalk and branches tend to close it to such an extent that it interrupts the inflow of air therein and thereby increases the effect of the air stream on the bolls carried on the shorter stems or twigs which may be the first to pass through the throat. Successive plants entering the throat likewise serve in keeping the throat partially closed so that a strong flow of air continues to be applied to the preceding plant during the stripping operation thereon.

A further object of my invention resides in the means I employ for finally stripping the bolls from the limbs of the plants which is so arranged that, as the mechanism passes along the row, the plants, their main stalks and stems are straightened into an upright position so that the air stream entering from below strikes the cotton tufts in the natural direction in which they are the most easily removed from the bolls. And in this position they are held until the plants emerge in a clean stripped condition by being dragged out of the machine as it passes onward.

Another object of my invention comprehends the employment, in a multiple row harvester, of separate means for creating the air stream employed with the strippers for the different rows which prevents any change in pressure in one from affecting that in another as may occur if a mechanism becomes clogged, or in its passage over a field reach a point devoid of plants.

To these and other ends, my invention embodies certain other advantageous features, all as will be described in the following specification, the novel features thereof being set forth in the appended claims.

In the drawings:

Fig. 1 is a side view of a cotton harvester, illustrating one embodiment of my invention.

Fig. 2 is a plan view thereof.

Fig. 3 is an enlarged fragmentary vertical section, showing the operating means for the harvester head.

Fig. 4 is a bottom plan view of the suction head of Fig. 3, a somewhat enlarged showing of the strippers in the form of perforated rolls.

Fig. 5 is an enlarged end view of the chain and sprocket drive for operating the rolls shown in Fig. 4.

Fig. 6 is an enlarged transverse vertical section taken along the line $6^x$—$6^x$ of Fig. 4.

Fig. 7 is a fragmentary vertical section of the discharge conduit, showing the separate paths for the cotton and for the foreign matter.

Fig. 8 is a side elevation of a harvester head.

Fig. 9 is a front view of the harvester head looking into the flared opening, the rear end thereof being elevated slightly.

Fig. 10 is a fragmentary vertical longitudinal section, showing the adjustment for the roll which controls the effective operating length of the output of the harvesting head, said adjustment being also shown in Figures 4 and 8.

Fig. 11 is a cross sectional view taken on the line $11^x$—$11^x$ of Fig. 8.

Fig. 12 is a view similar to Fig. 11, illustrating a modification stripper and air discharge nozzles.

Fig. 13 is a sectional view taken on the line $13^x$—$13^x$ of Fig. 12.

Fig. 14 is a diagrammatic view illustrating the manner in which a harvesting head embodying my invention acts successively on cotton plants, one entering its throat, a second being in straightened position and being stripped, and a third emerging from the head.

In the drawings I have shown a cotton harvester constructed in accordance with my invention and with which I have demonstrated by field operations the commercial practicability of the principles set forth and the serviceability of the different mechanisms employed in its construction.

In the harvesting of cotton it is necessary to first take into consideration the form of the matured plant. It has a main stem or stalk from which the several limbs carrying the bolls branch in various directions so that they spread over a considerable area. As the bolls mature, some extend upright, others project horizontally, and some topple over and hang downwardly. By the time pickers go into the fields the bolls, pads or capsules are fully opened and dry and hard. Usually by the time the pickers reach the plants in some fields, a considerable portion of the outer shreds of the tuft which still adheres to the pad have become loosened. These shreds spread out over the edges of the pod and are easily loosened.

A satisfactory cotton harvester must be able, as it traverses a row of cotton plants, to gather the branches extending laterally from each shrub into a central position with reference to the stalk and maintain this collection in an upright position for a given length of time during which a stream of air acts to free most of the cotton. Since a certain percentage of the cotton will always adhere to some of the bolls, it is necessary to strip these from the limbs of the plant.

All of these operations I accomplish by means of a harvester head, one or more of which I preferably mount on a farm tractor in order to have a convenient source of power for advancing the heads against the resistance offered by the plants, actuating the stripper rolls, and driving the various pieces of apparatus for creating the necessary air pressure in the several heads.

For purposes of illustration, I have shown in Figs. 1 and 2 a tractor 10 supported at its forward end on the steering wheels 11 and at its rear by the driving wheels 12 to which power is delivered through the usual transmission contained in the axle housing 13. At suitable points such as indicated by 15 I obtain power from the tractor motor for driving the air blowers. Also at 16, on the axle housing, I provide a shaft rotated by the axle transmission for driving the harvester head stripping rollers.

Extending downwardly and forwardly at each side of the vehicle I locate my harvesting heads in a position to traverse adjacent rows of cotton plants. They are constructed alike and comprise a frame which slopes upwardly and rearwardly and at its rear is pivoted to the vehicle at 20 to permit its forward end to be adjusted with reference to the ground level, as by means of the lifting rod 21 attached to a lever 122 which may be locked in adjusted position by any approved mechanism.

The harvester head (Fig. 4) is rectangular and is composed of parallel side pieces 22—23 connected at their upper rear ends by cross pieces 24—25. The lower forward end of the frame is open and extending horizontally therefrom are triangular shoes 22ª—23ª, the inner edges 22ᵇ—23ᵇ of which are inclined rearwardly to form a narrow entrance where they join the bases of the triangles 22ᶜ—23ᶜ. The frame side pieces 22—23 each also carry at their lower ends upwardly extending arms 22ᵈ—23ᵈ for holding the plant gathering wings.

Extending vertically from the inclined edges of the shoes are wings 125—126, the outer edges of which are curved outwardly or flared sufficiently to serve as a means of gathering the spreading branches of shrubs and directing them into the restricted area of the throat 225 formed at their rear edges. A shield 27 extends forwardly from the upper rear edges of the wings and is curved upwardly. Its purpose is to serve as a guide to direct the top branches of a shrub downwardly when necessary into said throat.

Carried on the harvester head frame in rear of its throat are a pair of rollers 28—29 located at opposite sides of the center line of the throat and spaced apart sufficiently to accommodate the stalks and branches of a cotton plant and yet serve to strip the bolls therefrom as the plant is dragged through the space between them as the head passes along the row. These rolls constitute strippers and, to aid in this operation, they are journaled at their lower forward ends 22ᵉ in the rear edges of the shoes and these ends 22ᶠ are pointed to facilitate the entrance of the stalks of the plants between them. At their upper rear ends the rolls are provided with shaft extensions 28ª—29ª journaled in the cross pieces 24—25. To facilitate their operation and aid in their straightening up the plant stalks and branches, I cause them to rotate in opposite directions and upwardly at their proximate edges. To this end in a two row harvester I transmit power directly to one of the rolls, for instance, roll 28 through the universal joint 28ᵇ from the shaft 30 which latter, in a multiple row harvester where there are a plurality of shafts corresponding to shaft 30, extends rearwardly as shown in Fig. 3 to the rear side of the power takeoff 16 where it is supplied with a sprocket 30ᵇ. Where there are two of the shafts 30 the second is provided with a similar sprocket 30ᶜ and the two sprockets may be driven by a chain 30ª trained around them and driven from the sprocket 16ª actuated by the power take-off (see Fig. 5). The shafts 28ª, 29ª of the rollers 28, 29, carry sprockets 28ᶜ, 29ᵇ which are driven by a chain 31 which also passes around a second sprocket 32 which is adjustable laterally to take up any slack that may develop in this drive.

The rolls 28 and 29 are hollow, and each of them is provided with perforations $a$ and $b$ respectively for the dual purpose of providing numerous inlets for air and forming flattened areas with edges which aid in the operation of stripping the bolls from the stalks of the plant.

The harvester head carries a wedge-shaped suction chamber, the lower portion of which is connected to spaced members 22 and 23 adjacent rollers 28 and 29. The upper portion of the chamber terminates in a circular opening which leads to conduit 41. The chamber is elongated at the bottom and extends substantially the entire length of the rolls 28—29. In cross section, as shown in Figs. 11 and 12, it is substantially V-shaped and is provided with a slit opening 135, which is adjacent the space between rolls 28 and 29. The rest of the top of the frame is covered with shield plates extending inwardly from the frame side pieces 22—23; as indicated at 22ᵈ—23ᵈ. The chamber comprises a hood formed of side walls 35—36, united at their lower edges to the proximate edges of the shield plates. The forward ends of the side walls are curved inwardly as at 35ª and 36ª and connected at their inturned ends to the spaced throat wings 25—26. Portions 35ª, 36ª and the throat 225 from the front wall of the hood. It also has a rear wall 37, the bottom edge of which joins the shields 22ᵈ—23ᵈ near the rear end of the frame and at a height above that of a normal cotton plant. Below this point and adjustable longitudinally on the lower side of the frame pieces 22—23 is a roller 38 journaled at each end to a pair of spaced lugs on plate 38ª, as seen in Figures 6 and 10. Roller 38 extends transversely of the stripping rolls and may be moved as occasion requires when operating on plants of different heights to direct them in their outward passage from the chamber. Plate 38ª serves to close off, against an inrush of air through the stripping rolls that part of them which is not required to be in operation. The described adjustment is provided by slotting the lower sides of the channel irons comprising the frame pieces 22 and 23, as indicated by 20ᵉ (Fig. 10), which receive clamping bolts 38ᵇ which secure the plate 38ᵃ in the roll 28 in adjusted position. The top of the chamber carries a circular collar 40 for the attachment of a tubular conduit.

Connected to the harvester heads are means for creating a flow of air inwardly of the throat and also an upward flow thereof from a point below the chamber, or a point at or below the contiguous faces of the stripping rolls. The purpose being to initially aid in drawing a plant into and through the narrow passage in the throat; thence straightening the stalks into a more or less vertical position and at the same time separating any free cotton fibers from the bolls, and finally as the bolls are stripped by contact with the rolls serving to direct the cotton thus liberated in a direction outwardly of the chamber. In the accomplishment of these ends, I connect said chambers with conduits 41 which lead from the collar 40 of each to a blower casing 42. The fan blades are not shown, but they are rotated by a shaft 43 having a central pulley driven by a belt 43ᵃ which, in turn, is driven by a pulley 43ᵇ on the jack shaft 44 carrying a second pulley 44ᶜ rotated by the belt 45 which entrains the pulley 46 on the power take-off shaft 15, said jack shaft extends in rear of the axle housing 13 from which it is supported in suitable bearings shown in dotted lines in Fig. 1 and indicated by 44ᵃ on the housing 13.

The outlets or stacks leading from the blower housings 42 ascend and may be united into a single discharge stack 50. In the latter, I provide means for screening out the foreign matter generally termed "trash," which includes dust, particles of earth, etc. To this end, I sweep the end of the stack rearwardly as shown in Fig. 7 in a curve having a relatively large radius and beginning at a point 50a, at the commencement of the curve on the inner side of the stack, I locate a screen 51, which is curved in the direction of the stack. The length of the screen is approximately a quadrant, and it is formed with a radius struck from a different center so that it divides this elbow portion of the stack into lower and upper outlets 52 and 53, the former being of a gradually lessening cross section while the latter is of a complementary increasing cross section. In this manner, I provide for automatically freeing the cotton trash which escapes through the screen with the greater proportion of the air, and yet maintain a sufficient flow of air in the smaller pipe to convey the free cotton to a point of discharge which may be into a trailer drawn in rear of the tractor. The functional operations of the machine described may be performed without rotating the rolls 28 and 29, they at such times serve as spaced bars between which the plant stalks are drawn. Whether the rolls are rotated or held stationary, the space between them is a slotted exit for the bottom of the overlying chamber or hood.

In Fig. 12 I have shown a modification of the harvester head in which I employ two spaced air discharge nozzles 60—61, of a length equivalent to that of the rolls 28 and 29, the contiguous edges of which serve as stripper bars. The nozzles per se are each formed as a pair of lips located on the inner sides of two parallel air conduits 62—63 which receive air under pressure from suitable blowers such as 42. These conduits extend upwardly and rearwardly, with reference to the direction of travel of the machine in the same manner as the perforated rolls 28—29, and the narrow space between the inner edges of their nozzles form the restricted opening through which the plants pass as the harvester is advanced along a row of plants. Because of the inclined position of these nozzles I provide in each of them a series of vertical vanes 66ᵃ as shown in Fig. 13 which direct the outwardly flowing air currents upwardly along the stalks of the plants.

With the above described air nozzles I employ the afore described suction chamber having the side walls 65—66 converging downwardly and embracing the outer edges of the nozzles 60, 61 and overlying the slot 67 between them.

I claim as my invention:

1. An apparatus for harvesting cotton comprising an inclined frame extending upwardly and rearwardly to its direction of movement, spaced stripper members extending longitudinally thereon, serving to support a plant in an upright position and strip the bolls from its branches, a substantially wedge-shaped chamber mounted on the frame, said chamber having walls extending upwardly from the said spaced members and terminating with means providing a circular opening, the front wall of the chamber constituting means providing a restricted opening in alignment with the space between the said stripper members, means operatively associated with said restricted opening for guiding plants therein, means operatively associated with the chamber for creating a flow of air entering the bottom of the chamber to create an exhaust action above the plant to convey the cotton from the plant bolls through said chamber and opening.

2. An apparatus for harvesting cotton comprising an inclined frame extending upwardly and rearwardly to its direction of movement, longitudinally extending perforated rolls journaled on the frame in spaced relation, the said rolls being rotatably driven in opposite directions for engaging a plant stem, supporting it in an upright position, gathering its branches together and stripping the bolls therefrom, a chamber having a botttom overlying the outer lateral edges of said rolls, walls extending upwardly from the bottom of the chamber terminating at the upper end thereof in means providing an outlet opening, the front wall of said chamber having a throated inlet extending from the forward extremity of said rolls to a point closely adjacent the outlet, means operatively associated with the chamber for creating a flow of air entering the bottom and throat of the chamber to convey the cotton from the bolls upwardly and out of the top of the chamber.

3. An apparatus for harvesting cotton as defined in claim 1 wherein the said spaced members are a pair of oppositely rotating perforated rolls journaled in the frame thereby providing a greater area through which air can be drawn for conveying the cotton from the chamber.

4. An apparatus for harvesting cotton comprising an inclined frame extending upwardly and rearwardly to its direction of movement, spaced stripper members extending longitudinally thereon serving to support a plant in an upright position and strip the bolls from its branches, a substantially wedge-shaped chamber mounted on the frame having walls extending upwardly from the said spaced members and terminating in means providing a circular opening, the front wall of the chamber being provided with a restricted opening extending from the forward end of the spaced members substantially to the circular opening, the said restricted opening being in alinement with the space between the said stripper members, diverging guides in front of the restricted opening for directing plants thereto, a conduit leading from the chamber opening, means operatively associated with the chamber and conduit for creating a flow of air entering the bottom of the chamber, thereby creating an exhaust action above the plant to convey the cotton from the plant bolls through said chamber and conduit.

JOSEPH L. HART, JR.

REFERENCES CITED

The following references are of record in the file of this patent:

UNITED STATES PATENTS

| Number | Name | Date |
| --- | --- | --- |
| 640,878 | Curley | Jan. 9, 1900 |
| 949,260 | Childs | Feb. 15, 1910 |
| 1,332,425 | Cassel | Mar. 2, 1920 |
| 1,342,528 | Chancellor | June 8, 1920 |
| 1,378,021 | Gipson | May 17, 1921 |
| 1,717,409 | Riza | June 18, 1929 |
| 1,722,747 | Hentz | July 30, 1929 |
| 1,886,152 | Benjamin | Nov. 1, 1932 |
| 1,961,447 | Nisbet | June 5, 1934 |
| 2,240,168 | Adkisson | Apr. 29, 1941 |